US007525884B2

(12) United States Patent
Mano

(10) Patent No.: US 7,525,884 B2

(45) Date of Patent: Apr. 28, 2009

(54) POSITION CONTROL APPARATUS AND METHOD FOR AN OPTICAL DISK RECORDING/REPRODUCING APPARATUS WITH INTERLINKED ON/OFF OF A PHASE COMPENSATOR AND ON/OFF OF A SERVO LOOP

(75) Inventor: Kiyoshi Mano, Shinagawa-ku (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 11/174,552

(22) Filed: Jul. 6, 2005

(65) Prior Publication Data

US 2005/0243667 A1 Nov. 3, 2005

Related U.S. Application Data

(62) Division of application No. 10/182,370, filed as application No. PCT/JP01/10317 on Nov. 27, 2001, now Pat. No. 7,023,768.

(30) Foreign Application Priority Data

Nov. 28, 2000 (JP) ............................ 2000-361379

(51) Int. Cl.
*G11B 7/00* (2006.01)

(52) U.S. Cl. ............. 369/44.29; 369/47.38; 369/44.27; 369/44.28; 369/47.39

(58) Field of Classification Search ............. 369/44.27, 369/44.28, 47.38, 47.39; *G11B 7/00, 19/00, G11B 15/46*

See application file for complete search history.

(56) References Cited

U.S. PATENT DOCUMENTS 4,878,211 A * 10/1989 Suzuki et al. ............ 369/44.35

FOREIGN PATENT DOCUMENTS

| | | |
|---|---|---|
| JP | 62-295269 | * 12/1987 |
| JP | 5-62218 | 3/1993 |
| JP | 8-249687 | 9/1996 |
| JP | 10-079132 | 3/1998 |
| JP | 10-134356 | 5/1998 |

* cited by examiner

*Primary Examiner*—Jorge L Ortiz Criado

(74) *Attorney, Agent, or Firm*—Oblon, Spivak, McClelland, Maier & Neustadt, P.C.

(57) ABSTRACT

The present invention aims to obtain a position control device which, even if the range within which a mechanical part can be pulled in for position control is narrow, enables quickly stabilizing the pull-in operation. It provides a position control apparatus which includes position error signal detection means (15*a*, 15*c*) for detecting a position error signal of the mechanical part and position control means (21*a*, 21*b*, 21*c*) for controlling the position of the mechanical part by supplying to it the position error signal from the position error signal detection means (15*a*, 15*c*), whereby the apparatus has provided therein phase compensation means (18) comprising a digital filter; the position error signal is supplied to the phase compensation means (18) to perform phase compensation thereon and the phase-compensated position error signal is supplied to the position control means (21*a*, 21*b*, 21*c*); and, when starting a closed-loop control, filter variables that were used at a time preceding by an amount of time equal to or greater than that corresponding to the amount of one sampling time of the digital filter (18) have been reset.

18 Claims, 13 Drawing Sheets

OH
SB
FE
SUM
TE
LPF
LPF
LPF
A/D
A/D
A/D
D S P
D/A
D/A
D/A
LPF
LPF
LPF
F-DV
T-DV
SL-DV
1
2
3
4
5
6
7
8
9
10
11
12
13
14
15a
15b
15c
16a
16b
16c
17a
17b
17c
18
19a
19b
19c
20a
20b
20c
21a
21b
21c

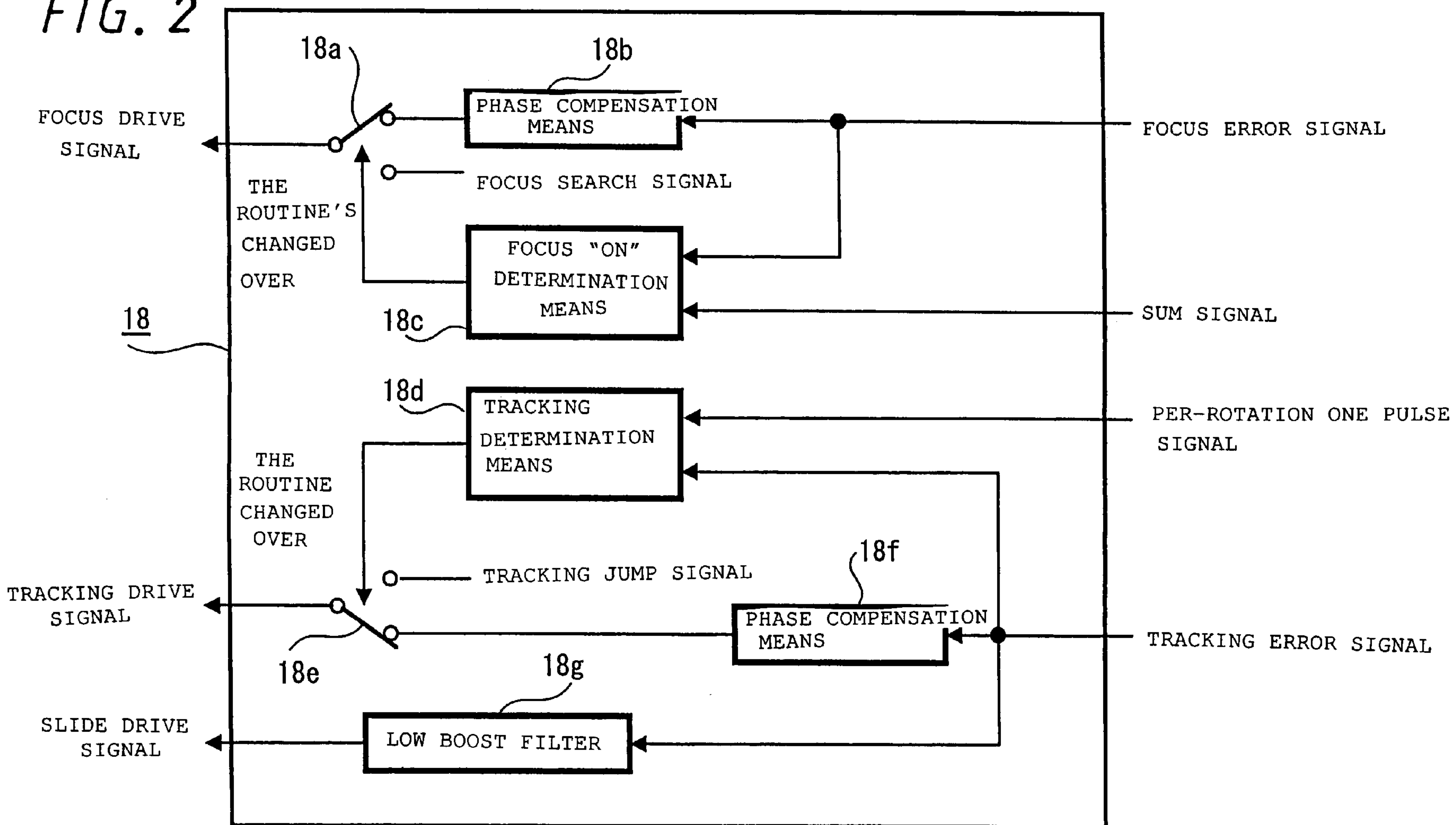
FIG. 2
18a
18b
PHASE COMPENSATION MEANS
FOCUS DRIVE SIGNAL
FOCUS ERROR SIGNAL
FOCUS SEARCH SIGNAL
THE ROUTINE'S CHANGED OVER
FOCUS "ON" DETERMINATION MEANS
SUM SIGNAL
18
18c
18d
TRACKING DETERMINATION MEANS
PER-ROTATION ONE PULSE SIGNAL
THE ROUTINE CHANGED OVER
TRACKING JUMP SIGNAL
18f
TRACKING DRIVE SIGNAL
PHASE COMPENSATION MEANS
TRACKING ERROR SIGNAL
18e
18g
SLIDE DRIVE SIGNAL
LOW BOOST FILTER FIG. 3
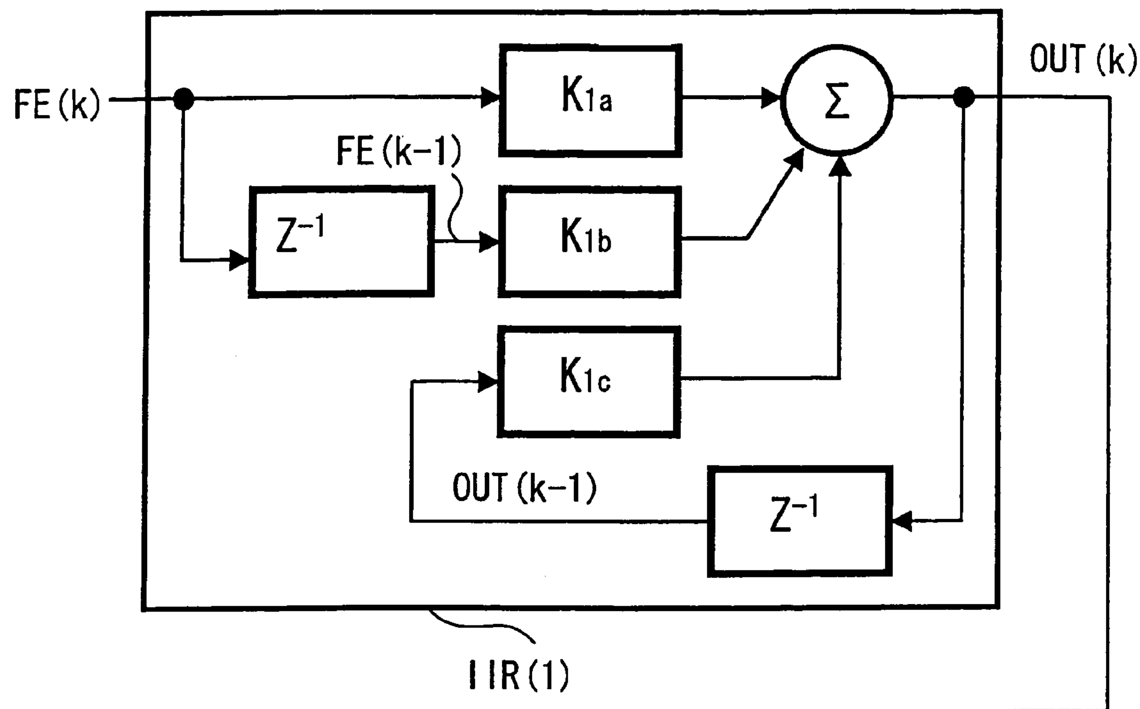
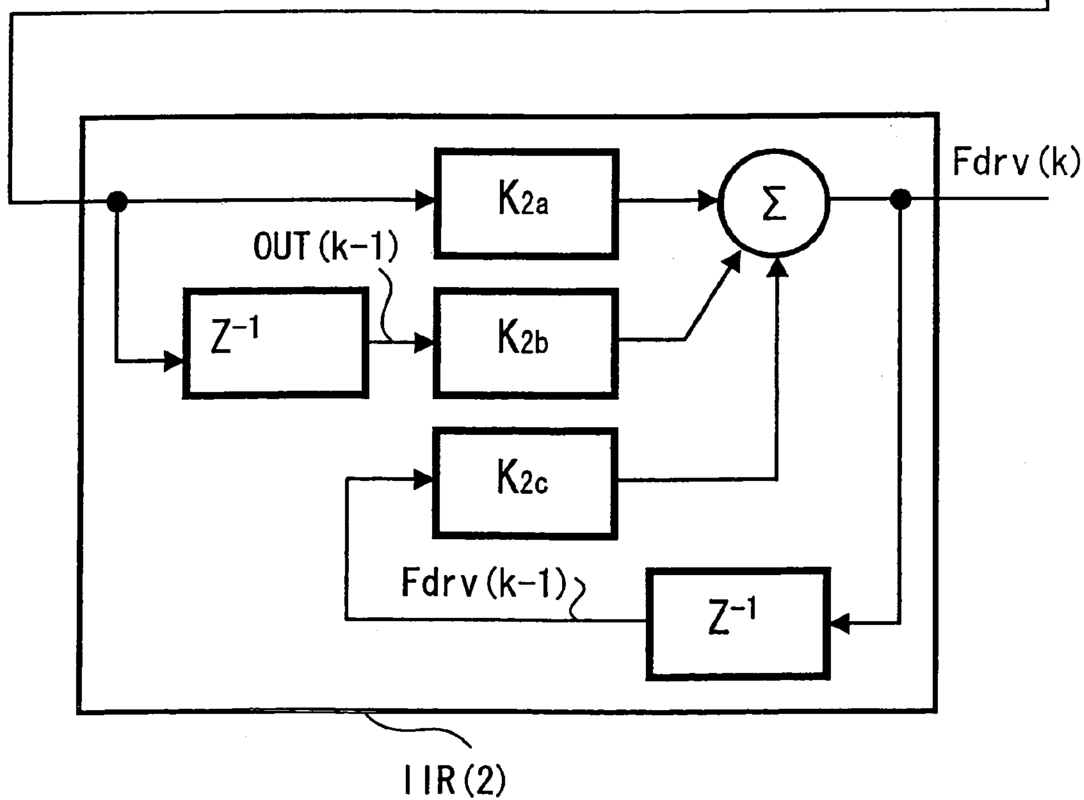

FIG. 7
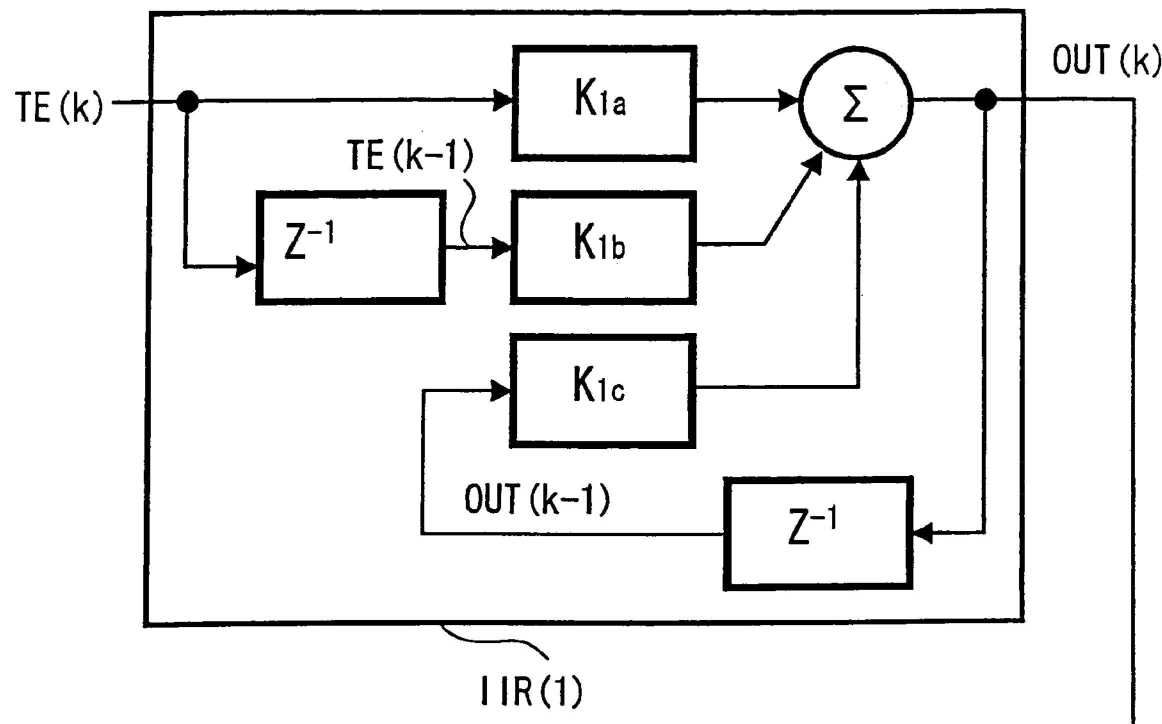
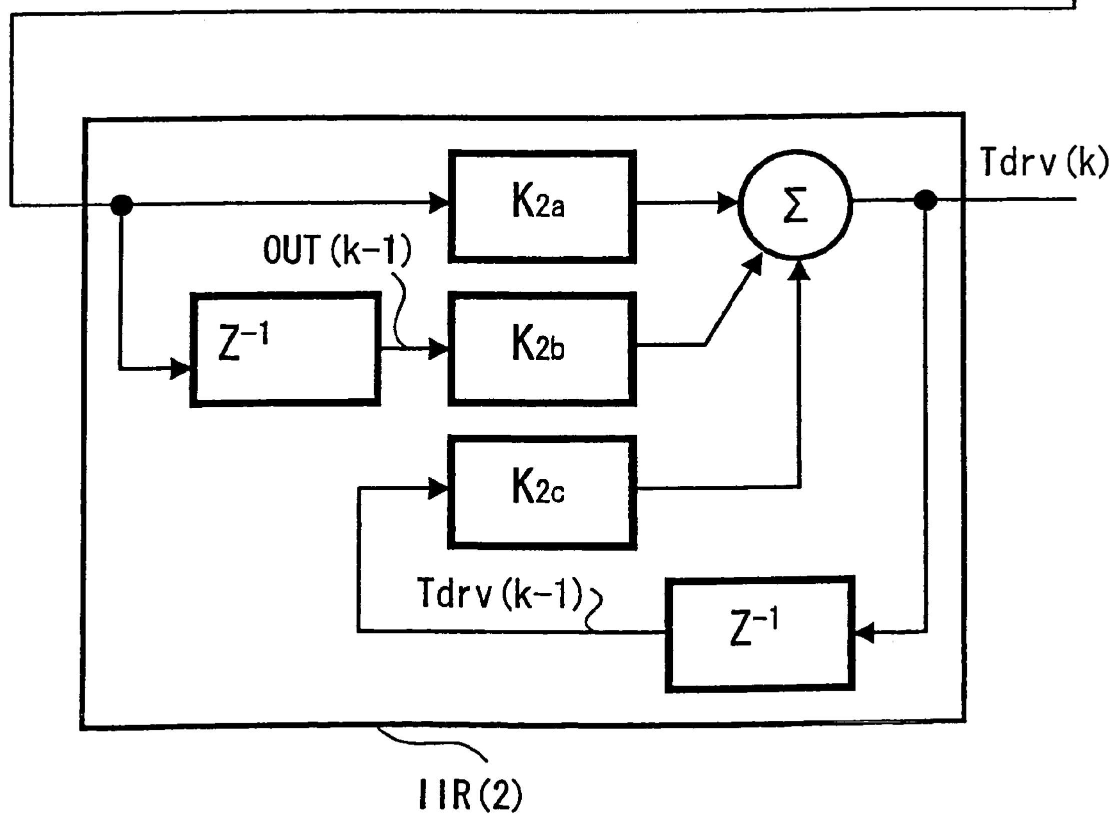

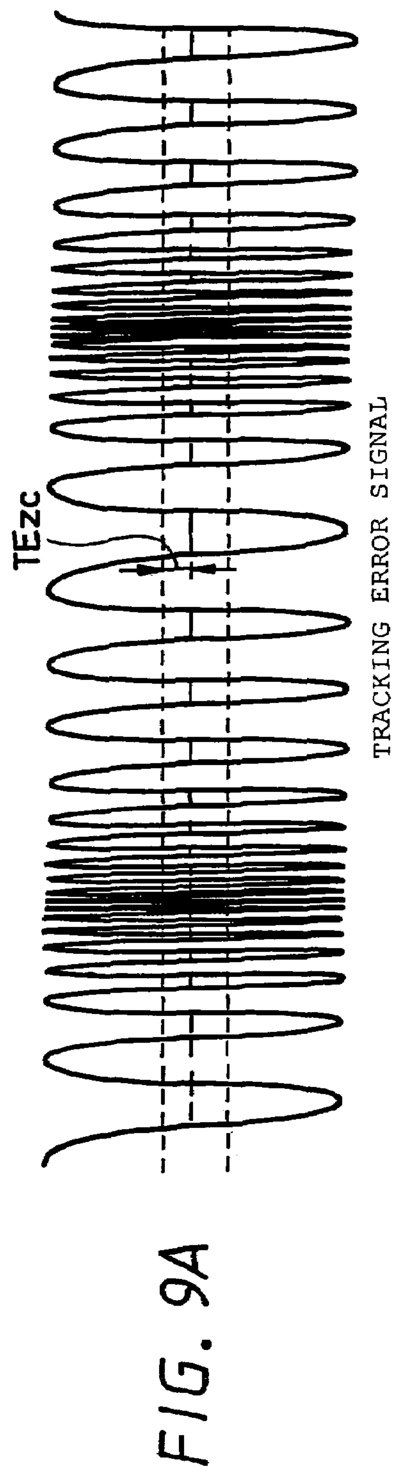
FIG. 9A
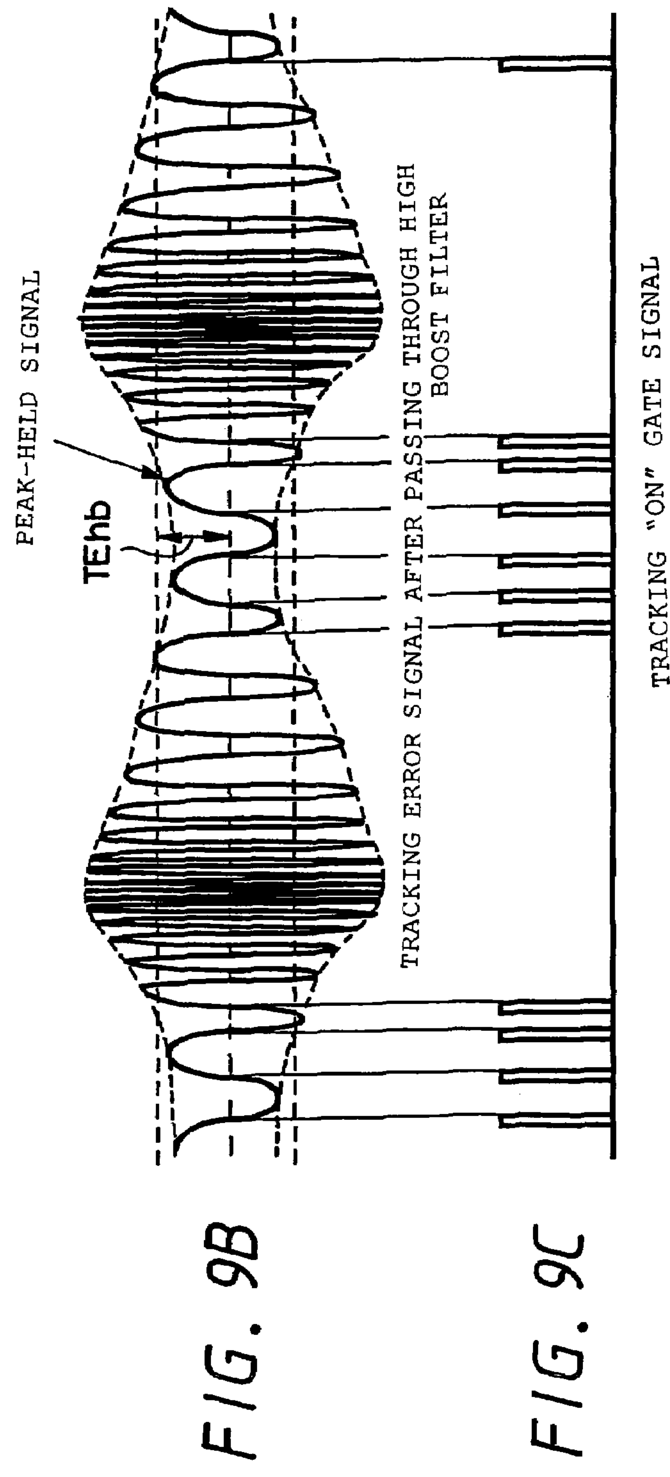
FIG. 9B
FIG. 9C

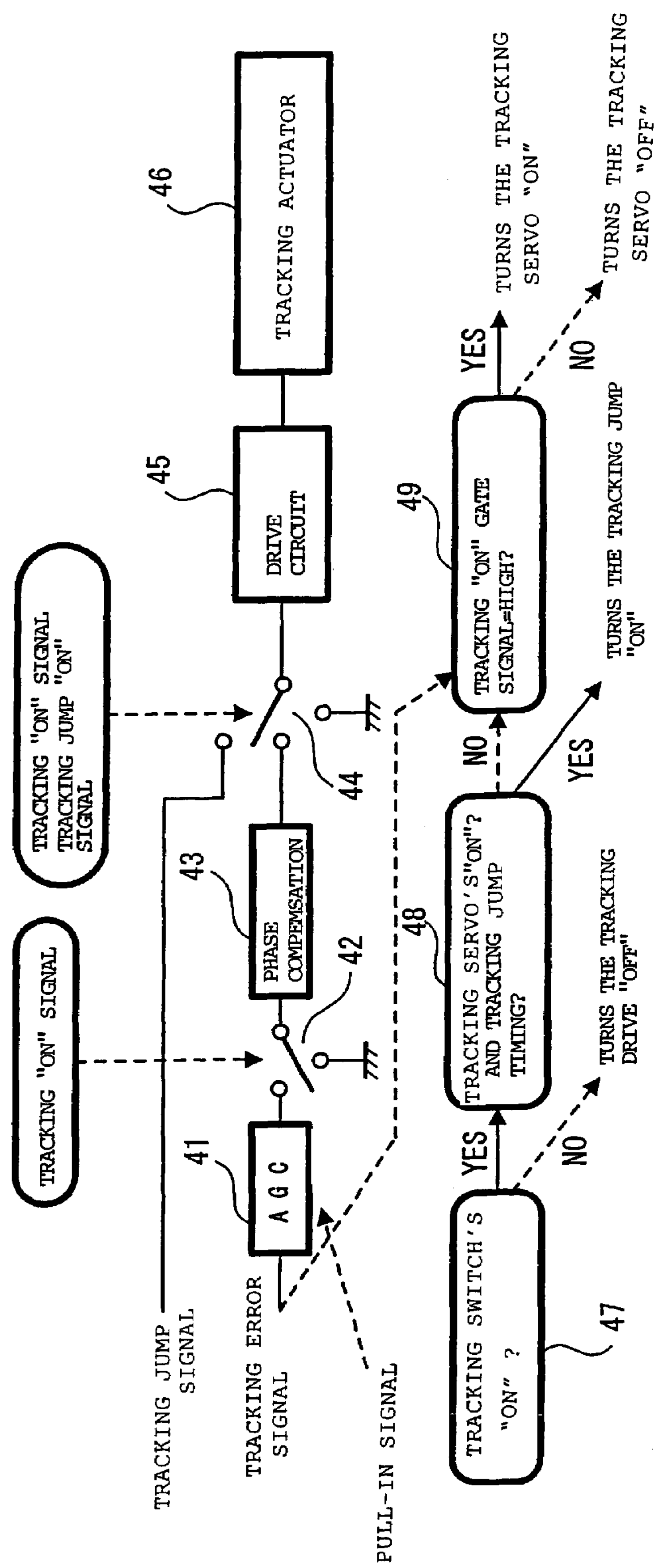
FIG. 10
TRACKING "ON" SIGNAL
TRACKING "ON" SIGNAL
TRACKING JUMP "ON" SIGNAL
46
TRACKING ACTUATOR
45
DRIVE CIRCUIT
43
PHASE COMPEMSATION
42
44
41
A G C
TRACKING JUMP SIGNAL
TRACKING ERROR SIGNAL
PULL-IN SIGNAL
47
TRACKING SWITCH'S "ON" ?
YES
NO
TURNS THE TRACKING DRIVE "OFF"
48
TRACKING SERVO'S"ON"? AND TRACKING JUMP TIMING?
NO
YES
TURNS THE TRACKING JUMP "ON"
49
TRACKING "ON" GATE SIGNAL=HIGH?
YES
NO
TURNS THE TRACKING SERVO "ON"
TURNS THE TRACKING SERVO "OFF"

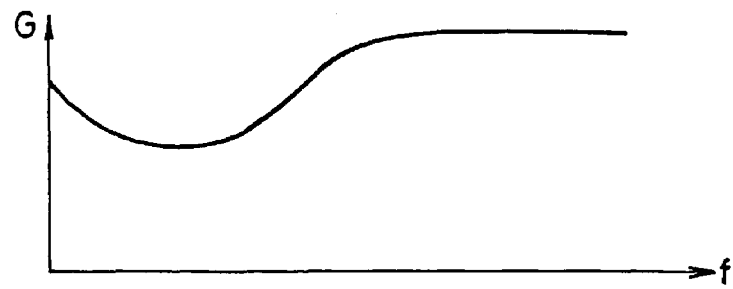
FIG. 12A
PRIOR ART
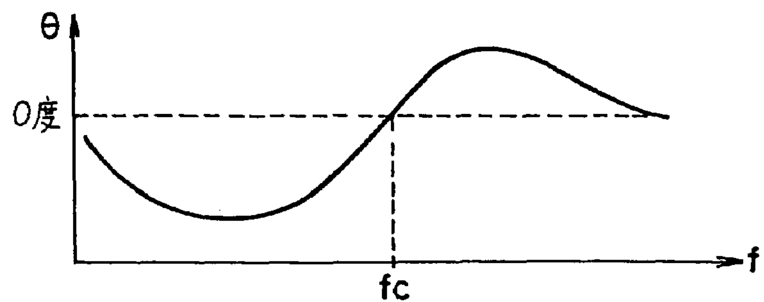
FIG. 12B
PRIOR ART
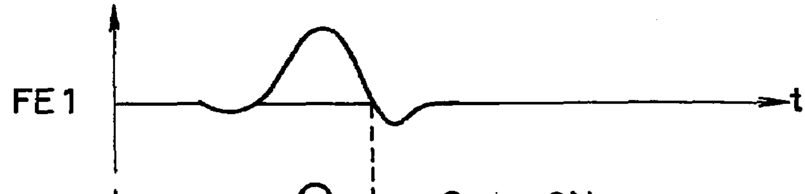
FIG. 13A
PRIOR ART
FIG. 13B
PRIOR ART
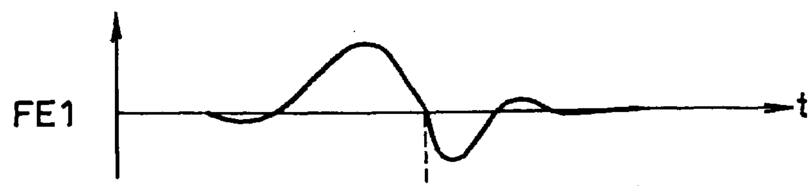
FIG. 13C
PRIOR ART
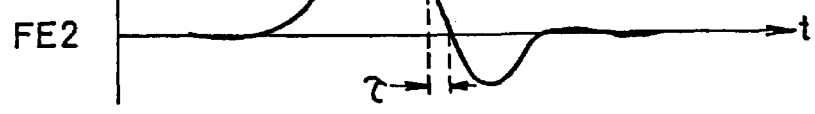
FIG. 13D
PRIOR ART

POSITION CONTROL APPARATUS AND METHOD FOR AN OPTICAL DISK RECORDING/REPRODUCING APPARATUS WITH INTERLINKED ON/OFF OF A PHASE COMPENSATOR AND ON/OFF OF A SERVO LOOP

CROSS-REFERENCE TO RELATED APPLICATIONS

The present application is a divisional of U.S. application Ser. No. 10/182,370, filed on Nov. 25, 2002, the entire contents of which are hereby incorporated herein by reference, and in turn claims priority to JP 2000-361379 filed on Nov. 28, 2000.

TECHNICAL FIELD

The present invention relates to position control apparatus and position control method, an optical disc recording apparatus and method, and an optical disc reproducing apparatus and method.

BACKGROUND ART

In an optical disc recording and reproducing apparatus, in which information is recorded with respect to an optical disc, or information is reproduced from the optical disc having the information recorded therein, it is needed to control the position of each of many mechanical parts. Among such many mechanical parts, especially with respect to the position control for an objective lens of the optical head (optical pick-up), a high-speed and high-precision control needs to be performed.

Taking up the focus servo for an objective lens as an example, whereas the optical disc makes a plane vibration of several hundreds of μm, the objective lens has a permissible error of 100 nm or less. Therefore, it is necessary to decrease the steady-state deviation of the objective lens as greatly as possible. In addition, since the range within which a focus control error signal for the objective lens is generated is only within several μm, even when the steady-state deviation is very small, if the overshoot is large when starting the control of the focus servo, the focus servo goes beyond the pull-in range. As a result, it becomes impossible to normally start the control of the focus servo.

In the case of a tracking servo for the objective lens, with a decrease in the track pitch of the optical disc, the problem exists that the pull-in operation of the tracking servo cannot be stabilized due to a very small overshoot at the time of starting the servo.

First, with reference to FIG. 11, a focus servo which is used in a conventional optical disc recording and reproducing apparatus will be explained. By discrimination means 37, it is discriminated whether a focus drive changeover switch 34 is in an "ON" state. If "NO", i.e. the focus drive changeover switch 34 is in an "OFF" state and so the input side of a drive circuit 35 is in a grounded state, the focus drive turned "OFF". A focus error signal which is obtained by calculating the optical-detection output signal from a multi-divisional photodetector of the optical head is supplied to an AGC (Automatic Gain Control) circuit 31 and, in correspondence with the level of a Pull-In signal, has its level automatically controlled. Then, the signal is supplied to a phase compensation circuit 33 and its phase is compensated.

When "YES" discrimination is made by the discrimination means 37, namely when the focus drive changeover switch 34 is turned "ON", the focus search signal and the focus error signal from the phase compensation circuit 33 which has its level automatically controlled and has its phase-compensated are changed over between them, under the control of the focus search "ON" signal and the focus "ON" signal, by the focus search drive changeover switch 34, and this signal is supplied to the drive circuit 35.

For a while after the focus drive changeover switch 34 is turned "ON" from its "OFF" state, it is discriminated by discrimination means 38, after the absolute value of the focus error exceeds a set value, whether the absolute value of the focus error is smaller than a predetermined threshold value $\epsilon fe$ and, in addition, the pull-in signal is greater than a threshold value PIon. When "NO" discrimination is made by the discrimination means 38, the focus drive changeover switch 34 is changed over to the focus search "ON" side by the focus search "ON" signal, and the focus search signal is supplied to the focus drive circuit 35 via the changeover switch 34. And, by the focus drive signal from that drive circuit 35, a focus actuator 36 is driven.

When, thereafter, "YES" discrimination is made by the discrimination means 38, the focus is turned "ON" by the focus "ON" signal, and then the focus drive changeover switch 34 is changed over to the phase compensation circuit 33 side, whereby the focus error signal whose level is automatically controlled and whose phase is compensated is supplied to the drive circuit 35 via the focus drive changeover switch 34. And, by the focus drive signal from that drive circuit 35, the focus actuator 36 is driven, whereby the servo loop is closed.

Here, attention is paid to the focus drive signal at the moment when the focus drive changeover switch 34 has been turned "ON", namely the focus error signal that has been outputted from the phase compensation circuit 33. The characteristics of the gain G and phase (θ) of the phase compensation circuit 33 of FIG. 11 with respect to the frequency are illustrated in FIGS. 12A and 12B, and hereafter an explanation will be given of these FIGS. 12A and 12B. The characteristic of the gain G of the phase compensation circuit 33 with respect to the frequency is set such that when the frequency f increases the gain G may become higher than when the frequency f is low. Namely, the frequency in the high range in the focus error signal is stressed. On the other hand, the characteristic of the phase θ of the phase compensation circuit 33 with respect to the frequency is set such that, with a frequency $f=fc$ as the border, in the higher range the phase may be advanced and in the lower range the phase may be lagged.

Accordingly, the polarity of the focus drive signal immediately after the turning-"ON" of the focus servo, namely the focus error signal from the phase compensation circuit 33 does not always become a servo signal that makes the relative speed between the objective lens and the optical disc low.

Next, with reference to FIG. 13, an explanation will be given of the focus error signal and the phase-compensated focus error signal. FIGS. 13A and 13C are waveform views respectively illustrating changes of the focus error signal FE1 with respect to time t. FIGS. 13B and 13D are waveform views respectively illustrating changes of the phase-compensated focus error signal (focus drive signal) FE2 with respect to time t.

As illustrated in FIGS. 13A and 13B, in a case where the phase of the focus drive signal FE2 illustrated in FIG. 13B is advanced relative to the focus error signal FE1 illustrated in FIG. 13A, the moment the focus servo is closed (the servo is turned "ON"), the objective lens is driven in the direction of making the relative speed between the objective lens and the optical disc low. As a result of this, the excellent pull-in operation of the focus servo for the objective lens is performed.

In contrast to this, as illustrated in FIGS. 13C and 13D, in a case where the phase of the focus drive signal FE2 illustrated in FIG. 13D is lagged relative to the focus error signal FE1 illustrated in FIG. 13C, at the instant the focus servo loop is closed (the servo is turned "ON"), the objective lens is driven in the direction of making the relative speed between the objective lens and the optical disc high. Therefore, an overshoot of the focus servo is generated. The τ in FIG. 13D indicates the period during which the relative speed is increased. Since the pull-in operation range of the focus servo at the time of driving the optical disc to rotate is as very narrow as several μm or less, it happens that the pull-in operation fails due to a very small overshoot at the time of the turning-"ON" of the servo.

Next, with reference to FIG. 14, an explanation will be given of a tracking servo which is used in the conventional optical disc recording and reproducing apparatus. By discrimination means 47, it is determined whether a tracking drive changeover switch 44 is "ON" or not. If "NO", namely the tracking drive changeover switch 44 is "OFF" and the input side of a drive circuit 45 is kept grounded, the tracking drive becomes turned "OFF".

A tracking error signal which is obtained by calculating the optical-detection outputs from the multi-divisional photodetector of the optical head is supplied to an AGC (Automatic Gain Control) circuit 41, and, in correspondence with the level of the Pull-In signal, the level of that tracking error signal is automatically controlled and then this signal is supplied to a phase compensation circuit 43 so that its phase is compensated.

When "YES" discrimination is made by the discrimination means 47 and the tracking drive changeover switch 44 is turned "ON", a tracking jump signal and the tracking error signal from the phase compensation circuit 43 which has its level automatically controlled and has its phase-compensated are changed over between them by the tracking drive changeover switch 44, under the control of a tracking jump "ON" signal and a tracking "ON" signal. And, this changed-over signal is supplied to the drive circuit 45. For a while after the tracking drive changeover switch 44 is changed over from "OFF" to "ON" state, it is discriminated, by a monitor for a tracking gate signal, whether the tracking "ON" gate signal has a high level. When the judgment of the discrimination means 49 is "YES", the tracking servo goes "ON" while when "NO" the tracking servo goes "OFF".

The tracking "ON" gate signal has a high level when the following occurs. Namely, it has a high level when the absolute value of the tracking error signal of FIG. 9A as later described is smaller than a set value TEzc and when the absolute value of the peak-held tracking error signal after passing through a high boost filter shown in the FIG.9B is smaller than a set value TEhb as described later on.

After the tracking servo is turned "ON", it is discriminated, by discrimination means 48, whether the tracking servo is "ON" and whether now is the tracking jump timing or not. When "YES", namely the time is the tracking jump timing, the tracking jump is turned "ON". When, by the tracking jump "ON" signal, the tracking drive changeover switch 44 is changed over to the tracking jump signal side, this tracking jump signal is supplied to a tracking drive circuit 45 via the tracking drive changeover switch 44. As a result of this, by the tracking drive signal from the drive circuit 45, a tracking actuator 46 is driven.

Incidentally, at the time, as well, of starting this tracking servo operation, for the same reason as in the case of the focus servo operation, it sometimes happens that an overshoot occurs in the vicinity of an adjacent track. This becomes an obstacle to stably starting the tracking servo operation. This tendency is becoming more and more prominent as the track pitch decreases with the increase in the density of the information on the optical disc.

In view of the above-described points in problem, the present invention is intended to propose a position control apparatus and position control method, a recording apparatus and method for an optical disc, and a reproducing apparatus and method for an optical disc, in each of which, even when the range within which a mechanical part is pulled in for position control is small, the pull-in operation can quickly be stabilized.

DISCLOSURE OF THE INVENTION

A position control apparatus according to the present invention is a position control apparatus which includes position error signal detection means for detecting a position error signal of a mechanical part and position control means for controlling the position of the mechanical part by supplying to it the position error signal from the position error signal detection means, wherein the apparatus is provided therein with phase compensation means comprising a digital filter; the position error signal be supplied to the phase compensation means to perform phase compensation thereon and the phase-compensated position error signal be supplied to the position control means; and, when starting a closed-loop control, variables of the filter that were used at a time preceding by an amount of time equal to or greater than that corresponding to the amount of one sampling time of the digital filter has been reset.

A position control method according to the present invention is a position control method which detects a position error signal of a mechanical part and controls the position of the mechanical part by the position error signal, wherein the method includes supplying the position error signal to phase compensation means comprising a digital filter to perform phase compensation thereon, controlling the position of the mechanical part by the phase-compensated position error signal, and, when starting a closed-loop control, putting variables of the filter that were used at a time preceding by an amount of time equal to or greater than that corresponding to the amount of one sampling time of the digital filter in a reset state.

An optical disc recording apparatus according to the present invention is a recording apparatus which includes position error signal detection means for detecting a position error signal of a mechanical part and position control means for controlling the position of the mechanical part by supplying to it the position error signal from the position error signal detection means, wherein the apparatus is provided therein with phase compensation means comprising a digital filter; the position error signal be supplied to the phase compensation means to perform phase compensation thereon and the phase-compensated position error signal be supplied to the position control means; and, when starting a closed-loop control, variables of the filter that were used at a time preceding by an amount of time equal to or greater than that corresponding to the amount of one sampling time of the digital filter has been reset.

An optical disc recording method according to the present invention is a recording method which detects a position error signal of a mechanical part and controls the position of the mechanical part by the position error signal, wherein the method includes supplying the position error signal to phase compensation means comprising a digital filter to perform phase compensation thereon, controlling the position of the mechanical part by the phase-compensated position error signal, and, when starting a closed-loop control, putting filter variables that were used at a time preceding by an amount of time equal to or greater than that corresponding to the amount of one sampling time of the digital filter in a reset state.

An optical disc reproducing apparatus according to the present invention is a reproducing apparatus which includes position error signal detection means for detecting a position error signal of a mechanical part and position control means for controlling the position of the mechanical part by supplying to it the position error signal from the position error signal detection means, wherein the apparatus is provided therein with phase compensation means comprising a digital filter; the position error signal be supplied to the phase compensation means to perform phase compensation thereon and the phase-compensated position error signal be supplied to the position control means; and, when starting a closed-loop control, filter variables that were used at a time preceding by an amount of time equal to or greater than that corresponding to the amount of one sampling time of the digital filter has been reset.

An optical disc reproducing method according to the present invention is a reproducing method which detects a position error signal of a mechanical part and controls the position of the mechanical part by the position error signal, wherein the method includes supplying the position error signal to phase compensation means comprising a digital filter to perform phase compensation thereon, controlling the position of the mechanical part by the phase-compensated position error signal, and, when starting a closed-loop control, putting filter variables that were used at a time preceding by an amount of time equal to or greater than that corresponding to the amount of one sampling time of the digital filter in a reset state.

A position control method according to the present invention is a position control method which includes position error signal detection means for detecting a position error signal of a mechanical part and position control means for controlling the position of the mechanical part by supplying to it the position error signal from the position error signal detection means, whereby the device is provided therein with phase compensation means; the position error signal be supplied to the phase compensation means to perform phase compensation thereon and the phase-compensated position error signal be supplied to the position control means; and, at a stage preceding the phase compensation means there be provided on/off switch means that is turned on or off in interlocking relationship with the on/off operation of a servo-loop. The present invention provides a position control method arranged to include detecting a position error signal of a mechanical part and controls the position of the mechanical part by the position error signal, the method comprising supplying the position error signal to phase compensation means to perform phase compensation thereon, controlling the position of the mechanical part by the phase-compensated position error signal, and turning on or off the position error signal supplied to the phase compensation means in interlocking relationship with the on/off operation of a servo-loop.

An optical disc recording apparatus according to the present invention is a recording apparatus which includes position error signal detection means for detecting a position error signal of a mechanical part and position control means for controlling the position of the mechanical part by supplying to it the position error signal from the position error signal detection means, whereby the apparatus is provided therein with phase compensation means; the position error signal is supplied to the phase compensation means to perform phase compensation thereon and the phase-compensated position error signal is supplied to the position control means; and, at a stage preceding the phase compensation means there is provided on/off switch means that is turned on or off in interlocking relationship with the on/off operation of a servo-loop.

An optical disc recording method according to the present invention is a recording method which detects a position error signal of a mechanical part and controls the position of the mechanical part by the position error signal, wherein the method includes supplying the position error signal to phase compensation means to perform phase compensation thereon, controlling the position of the mechanical part by the phase-compensated position error signal, and turning on or off the position error signal supplied to the phase compensation means in interlocking relationship with the on/off operation of a servo loop.

An optical disc reproducing apparatus according to the present invention is a reproducing apparatus which includes position error signal detection means for detecting a position error signal of a mechanical part and position control means for controlling the position of the mechanical part by supplying to it the position error signal from the position error signal detection means, whereby the apparatus is provided therein with phase compensation means; the position error signal is supplied to the phase compensation means to perform phase compensation thereon and the phase-compensated position error signal is supplied to the position control means; and, at a stage preceding the phase compensation means there is provided on/off switch means that is turned on or off in interlocking relationship with the on/off operation of a servo-loop.

An optical disc reproducing method according to the present invention is a reproducing method which detects a position error signal of a mechanical part and controls the position of the mechanical part by the position error signal, wherein the method includes supplying the position error signal to phase compensation means to perform phase compensation thereon, controlling the position of the mechanical part by the position error signal, and turning on or off the phase-compensated position error signal supplied to the phase compensation means in interlocking relationship with the on/off operation of a servo loop.

BRIEF DESCRIPTION OF DRAWINGS

FIG. 2 is a block diagram illustrating the function of a DSP (digital signal processor) serving as phase compensation means of the optical disc recording and reproducing apparatus illustrated in FIG. 1;

FIG. 3 is a block diagram illustrating the construction of focus phase compensation means (phase compensation filter means) 18*b* illustrated in FIG. 2;

FIG. 7 is a block diagram illustrating the construction of tracking phase compensation means (phase compensation filter means) 18*f* illustrated in FIG. 2;

FIG. 9 is a waveform diagram illustrating a method of producing a tracking "ON" gate signal;

FIG. 10 is a block diagram illustrating an example of a tracking servo of the recording and reproducing apparatus (recording and reproducing apparatus) for an optical disc according to the embodiment of the present invention;

FIG. 12 is a phase compensation characteristic board diagram of a phase compensation circuit 33 in the example of the focus servo of the optical disc recording and reproducing apparatus illustrated in FIG. 11;

FIG. 13 is a waveform diagram illustrating focus servo signals in a focus servo of the prior art optical disc recording and reproducing apparatus.

BEST MODE FOR CARRYING OUT THE INVENTION

Figure 1:
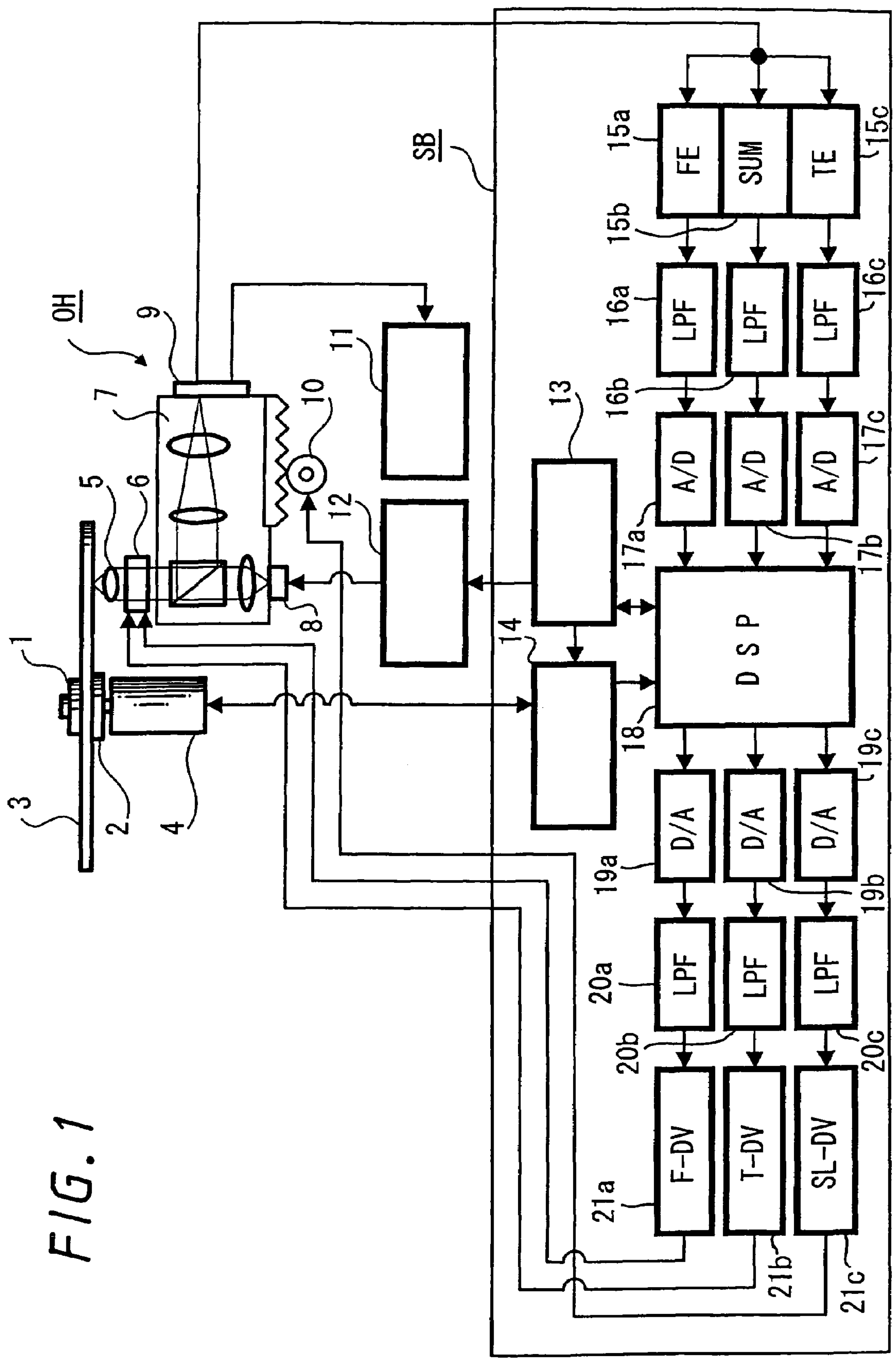
FIG. 1 is a block diagram illustrating an example of an optical disc recording and reproducing apparatus (recording apparatus and reproducing apparatus) according to an embodiment of the present invention.

Hereinafter, a construction of an example of an optical disc recording and reproducing apparatus (recording apparatus and reproducing apparatus) according to an embodiment of the present invention will be explained.

A reference numeral 3 denotes an optical disc and in this example, the optical disc is a two-layer optical disc having two information recording layers. However, it may be an optical disc having one information recording layer. Also, it may be an optical disc for use for reproduction only, such as a compact disc or CD-ROM disc, other than an optical disc enabling recording and reproduction to be performed with respect thereto, such as a magneto-optical disc, a phase change type optical disc, or an optical disc using pigment. It is to be noted that the use of a magneto-optical disc requires the use of a magnetic head for use for information recording.

The optical disc 3 is placed on a turn table 2 that is attached to a spindle motor 4 and also is fixed onto the turn table 2 by a chucking plate 1 and is thereby driven to rotate by the spindle motor 4. The spindle motor 4 is driven by a spindle motor driver 14.

OH is a reference symbol which represents an optical head (optical pick-up). It is constructed of a laser diode (semiconductor laser) 8, a multi-divisional photo-detector 9, an optical system 7, an objective lens 5, a biaxial drive actuator 6 for driving the objective lens 5 in the focusing and tracking directions, etc.

An optical-detection output from the photo-detector 9 is supplied to an RF amplifier 11 and is also supplied to a focus error signal forming operational circuit 15*a*, sum signal forming operational circuit 15*b*, and tracking error signal forming operational circuit 15*c* within a servoboard SB. A focus error signal, sum signal, and tracking error signal, which are respective output signals of the focus error signal forming operational circuit 15*a*, sum signal forming operational circuit 15*b*, and tracking error signal forming operational circuit 15*c*, are supplied to A/D converters 17*a*, 17*b*, and 17*c* via low pass filters 16*a*, 16*b*, and 16*c*, and they are respectively converted into digital signals. A digital focus error signal, digital sum signal, and digital tracking error signal, which are respective output signals from the A/D converters 17*a*, 17*b*, and 17*c*, are supplied to a DSP (digital signal processor) 18 serving as phase compensation means.

The phase-compensated digital focus error signal and digital tracking error signal from the DSP 18 are supplied to D/A converters 19*a* and 19*b* and are thereby converted into analog signals. And these focus error and tracking error signals are supplied to a focus driver (drive circuit) 21*a* and a tracking driver (drive circuit) 21*b*, respectively, via low pass filters 20*a* and 20*b*. The focus error signal and the tracking error signal from the focus driver 21*a* and the tracking driver 21*b* are supplied to the biaxial actuator 6.

Also, the digital tracking error signal that has been boosted in the low frequency (low-boosted) by the DSP 18 is supplied therefrom to a D/A converter 19*c* and is converted into an analog signal and this tracking error signal is supplied to a slide motor driver 21*c* via a low pass filter 20*c*, thereby the tracking error signal is supplied to a slide motor 10.

A controlling microcomputer 13 supplies a target rotations number instruction signal to the spindle motor driver 14, whereby the number of rotations of the optical disc 3 is controlled. The controlling microcomputer 13 controls a laser diode drive circuit 12 which controls the laser light output of the laser diode 8. The microcomputer 13 controls the DSP 18. The spindle motor driver 14 supplies to the DSP 18 a pulse signal that is generated one pulse per rotation of the spindle motor 4 from this motor 4.

Next, with reference to FIG. 2, the function of the DSP 18 of FIG. 1 will be explained. A focus servo phase compensation means 18*b* of FIG. 2, as illustrated in FIG. 3, is constructed of a cascade-connected and two-staged IIR (Infinite Impulse Response) filter means (1) and (2). By the digital focus error signal FE(k) being supplied to the preceding stage IIR filter means (1), the low frequency range is boosted and, by the output (k) of that preceding IIR filter means (1) being supplied to the succeeding stage IIR filter means (2), the phase in the high frequency range is advanced, whereby a digital focus drive signal Fdrv (k) is output from the IIR filter means (2).

Incidentally, in FIG. 3, the symbols $K_{1a}$, $K_{1b}$, $K_{1c}$, $K_{2a}$, $K_{2b}$, and $K_{2c}$ represent coefficient multipliers; $Z^{-1}$ represents 1-sample period delay means, and Σ represents adding means. Also, the symbol FE (k−1) represents a signal prepared by delaying the digital focus error signal FE (k) by one sample period. The symbol Fdrv (k−1) represents a signal prepared by delaying the digital focus drive signal Fdrv (k) by one sample period.

Turning back again to FIG. 2, the digital focus error signal and the digital sum signal are supplied to focus "ON" decision means 18*c*. According to this decision result, a changeover switch 18*a* is controlled to change, whereby changeover is made between the focus error signal and the focus search signal and the changed-over signal is, in either case, output as a focus drive signal.

Figure 4:
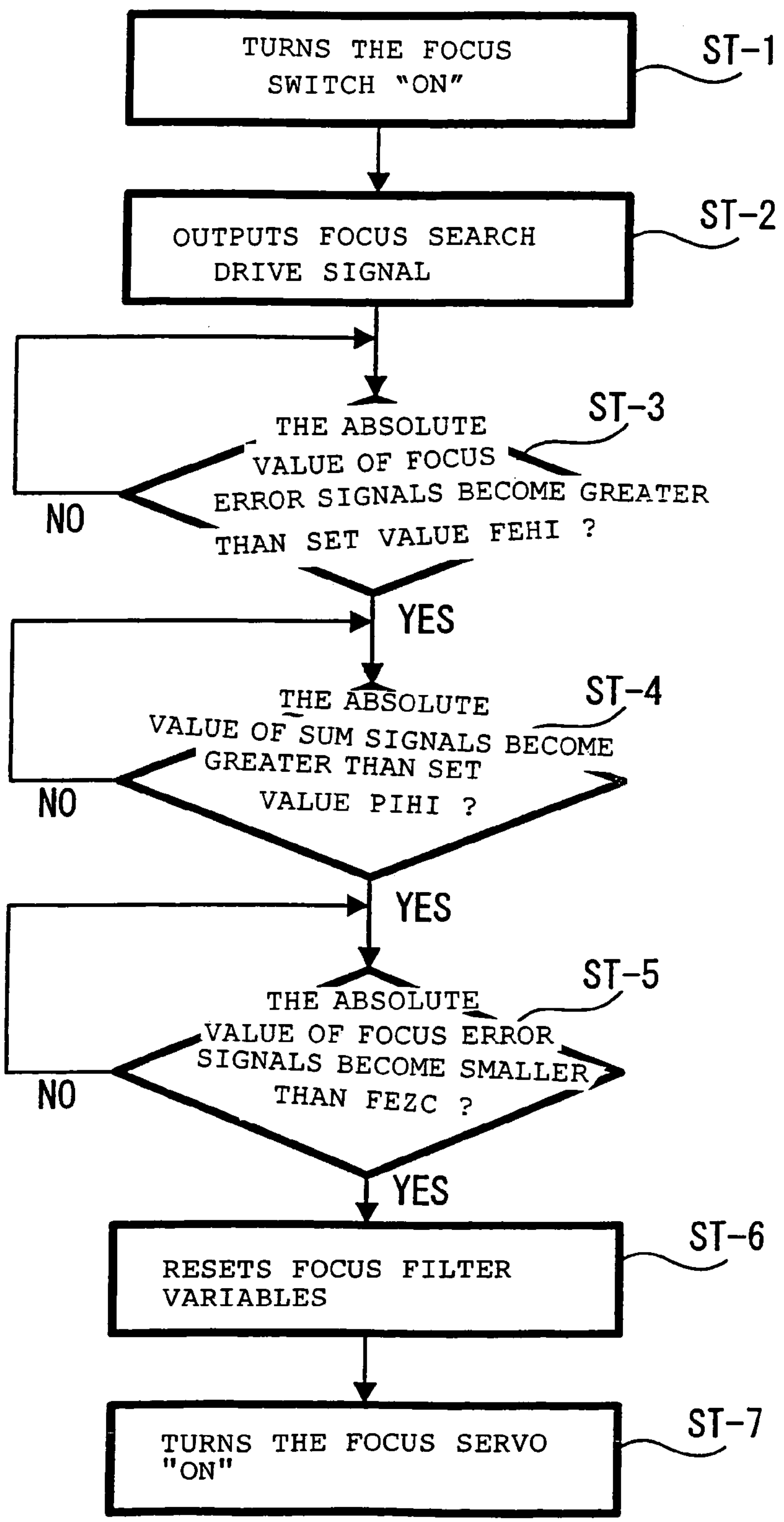
FIG. 4 is a flow chart illustrating the focus pull-in operation of the focus phase compensation means 18*b* illustrated in FIG. 2.

Next, with reference to a flow chart of FIG. 4, the focus pull-in operation of the focus "ON" decision means 18*c* in FIG. 2 will be explained. First, in a step ST-1, when the focus switch 18*a* is turned "ON", the operation flow proceeds to a step ST-2, in which the focus search signal is output via the focus switch 18*a* as the focus search drive signal, entering a focus "ON" condition determination loop. Next to the step ST-2, the flow proceeds to a step ST-3, in which it is judged whether the absolute value of the focus error signal has become greater than a set value FEhi. If "NO", the flow returns to the step ST-3 while if "YES", the flow proceeds to a step ST-4, in which it is judged whether the absolute value of the sum signal has become greater than a preset value PIhi or not. If "NO", the flow returns to the step ST-4, while if "YES", the flow proceeds to a step ST-5.

In the step ST-5, it is judged whether the absolute value of the focus error signal has become smaller than a set value FEzc or not. If "NO", the flow returns to the step ST-5, while, if "YES", the flow proceeds to a step ST-6. In the step ST-6, after resetting focus filter variables, the flow proceeds to a step ST-7, in which a focus servo is turned "ON" and a phase-compensated focus drive signal is output.

Incidentally, when starting a closed-loop control, in FIG. 3, the focus error signal FE (k−1) preceding one sample, the output signal OUT (k−1) preceding one sample, and the focus drive signal Fdrv (k−1) preceding one sample in the IIR filter means (1) and (2) are set as follows.

$$FE\ (k-1)=OUT\ (k-1)=Fdrv\ (k-1)=0$$

In this way, the variables are reset.

Figure 5A:
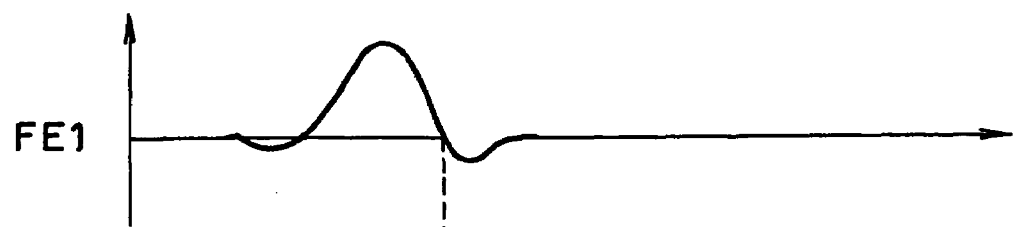
FIG. 5 is a waveform diagram illustrating the servo pull-in operation followed by the resetting of the variables in the IIR filter (FIG. 3) constructing the focus phase compensation means 18*b* illustrated in FIG. 2.
Figure 5B:
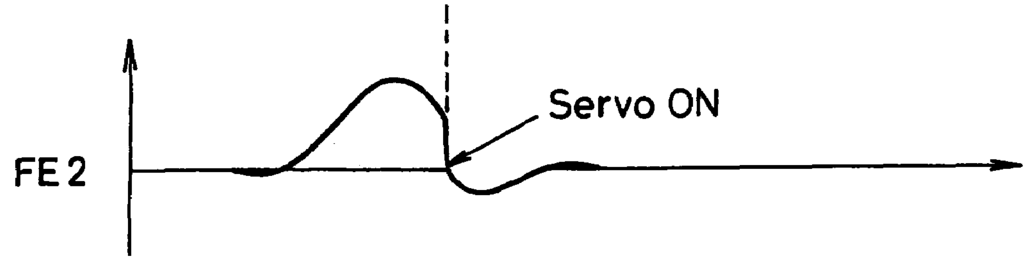

As illustrated in FIG. 5, the focus error signal FE1 and the phase-compensated focus error signal FE2, i.e. the focus drive signal, by the above-described resetting of the variables, each always become, from immediately after focus "ON", a signal that makes the relative speed between the objective lens 5 and the optical disc 3 low. Therefore, overshooting becomes lessened or decreased. Incidentally, although, here, the filter variables in the IIR filter means (1) and (2) of FIG. 3 which construct the focus phase compensation means 18*b* of FIG. 2 are reset immediately before focus "ON", it may be arranged that, when turning the focus "OFF", the filter variables be reset, and, until the focus thereafter becomes "ON", no filter calculation be performed. Also, here, although the variables that precede one sampling time are all reset, in a case where using a filter of higher dimensions that uses the historical record that more precedes, resetting all of the variables that are before an amount of time equal to or greater than the amount of time corresponding to one sampling time is preferable.

Figure 6:
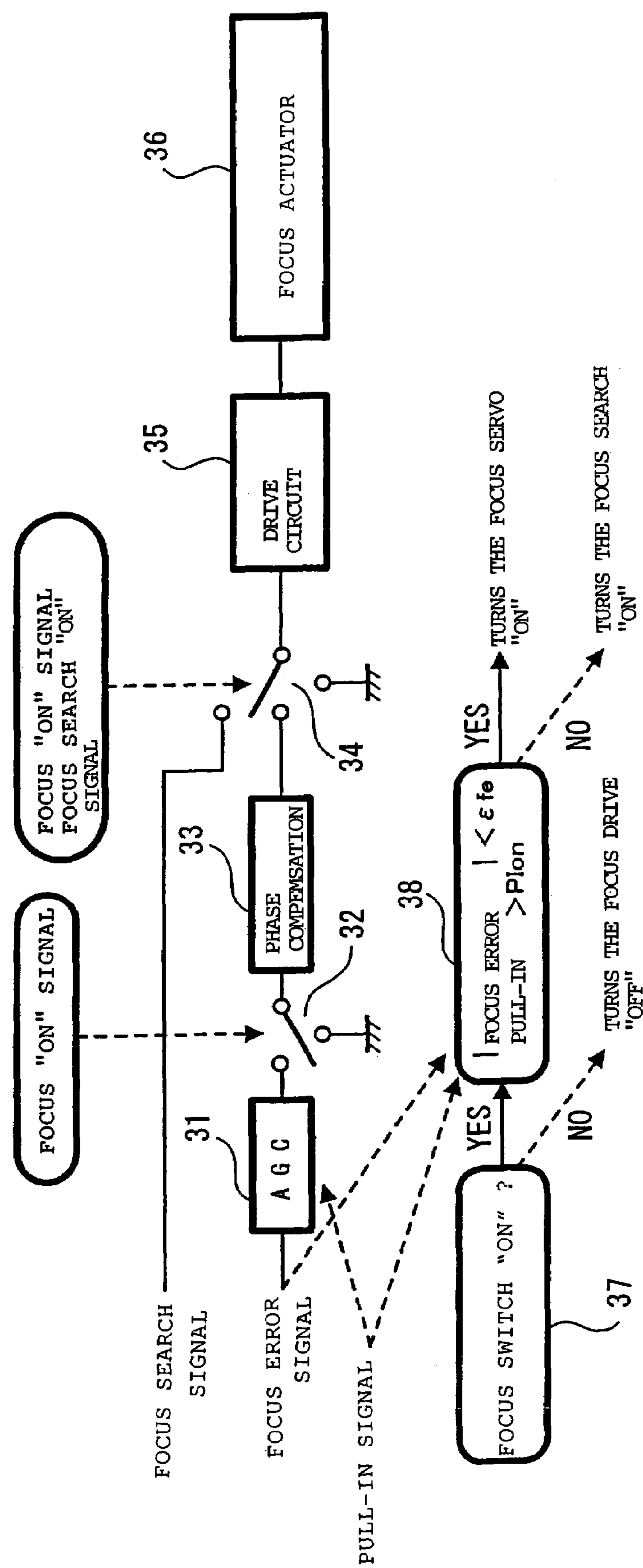
FIG. 6 is a block diagram illustrating an example of a focus servo of the optical disc recording and reproducing apparatus (recording and reproducing apparatus) according to the embodiment of the present invention.

Next, with reference to FIG. 6, an example of the focus servo having an analog construction will be explained. Whether a focus switch (not illustrated) indicating the instruction from the microcomputer is "ON" is discriminated by discrimination means 37. If "NO", the focus drive is turned "OFF".

The focus error signal that is obtained by calculating the optical-detection output from the multi-divisional detector 9 of the optical head 7 is supplied to an AGC (Automatic Gain Control) circuit 31. This signal has its level automatically controlled in correspondence with the level of a Pull-In signal and then, by passing through a focus switch 32 that was turned "ON" by the focus "ON" signal, is supplied to a phase compensation circuit 33, in which the signal is subjected to phase compensation.

By providing this switch 32, the focus drive signal supplied to a drive circuit 35 always becomes, from immediately after the focus is turned "ON", a signal making the relative speed between the objective lens 5 and the optical disc 3 low. Therefore, overshooting becomes decreased.

When a focus drive changeover switch is "ON", the focus search signal and the focus error signal from the phase compensation circuit 33 which has its level automatically controlled and has its phase-compensated are changed over by the focus drive changeover switch 34 controlled by the focus search "ON" signal and the focus "ON" signal and then the signal is supplied to the drive circuit 35.

For a while after the focus switch (not illustrated) is changed over from "OFF" to "ON", it is discriminated by discrimination means 38, after the absolute value of the focus error exceeds a set value, whether the absolute value of the focus error is smaller than a prescribed threshold value $\epsilon$fe and, in addition, the pull-in value is greater than a threshold value PIon. When "NO" discrimination is made by the discrimination means 38, the focus drive changeover switch 34 is changed over to the focus search signal side, whereby this focus search signal is supplied to the focus drive circuit 35 via the changeover switch 34, whereby a focus actuator 36 is driven by the focus drive signal from the drive circuit 35.

Thereafter, when "YES" discrimination is made by the discrimination means 38, the focus drive changeover switch 34 is changed over to the phase compensation circuit 33 side by the focus "ON" signal, whereby the focus error signal level of which is automatically controlled and the phase of which is compensated is supplied to the drive circuit 35 via the focus drive changeover switch 34, whereby the focus actuator 36 is driven by the focus drive signal from the drive circuit 35, whereby the servo loop is closed.

It is discriminated by discrimination means 38, after the absolute value of the focus error exceeds a set value, whether the absolute value of the focus error is smaller than the prescribed threshold value $\epsilon$fe and, in addition, the pull-in value is greater than the threshold value PIon. Thereby, when "YES" determination is made by the determination means 38, the switch 32 is changed over from "OFF" to "ON" by the focus "ON" signal.

Turning back again to FIG. 2, an explanation will be made. A tracking phase compensation means 18*f* in FIG. 2, as illustrated in FIG. 7, is constructed of a cascade-connected and two-staged IIR (Infinite Impulse Response) filter means (1) and (2). By the digital focus error signal TE(k) being low-boosted by the preceding stage IIR filter means (1), and, by the output (k) of that preceding IIR filter means (1) having the phase in its high frequency range advanced, a digital tracking drive signal Tdrv (k) is output from the IIR filter means (2).

Incidentally, in FIG. 7, the symbols $K_{1a}$, $K_{1b}$, $K_{1c}$, $K_{2a}$, $K_{2b}$, and $K_{2c}$ represent coefficient multipliers; $Z^{-1}$ represents 1-sample period delaying means, and $\Sigma$ represents adding means. Also, the symbol TE (k−1) represents a signal prepared by delaying the digital tracking error signal TE(k) by one sample period. The symbol Tdrv (k−1) represents a signal prepared by delaying the digital tracking drive signal Tdrv (k) by one sample period.

Turning back again to FIG. 2, the tracking error signal is supplied to the phase compensation means 18*f* and has its phase-compensated and then the tracking error signal having had its phase-compensated is supplied to a tracking switch 18*e*. The pulse signal from the spindle motor driver that is generated one pulse per rotation of the spindle motor and the tracking error signal are supplied to tracking decision means 18*d*. By the output of this tracking decision means 18*d*, the tracking switch 18*e* is on/off-controlled. By this tracking switch 18*e*, the tracking error signal which is phase-compensated and the tracking jump signal are changed over, whereby the signal is output as a digital tracking drive signal. Also, the tracking error signal is supplied to a low-boost filter 18*g* and is output as a digital slide drive signal.

Figure 8:
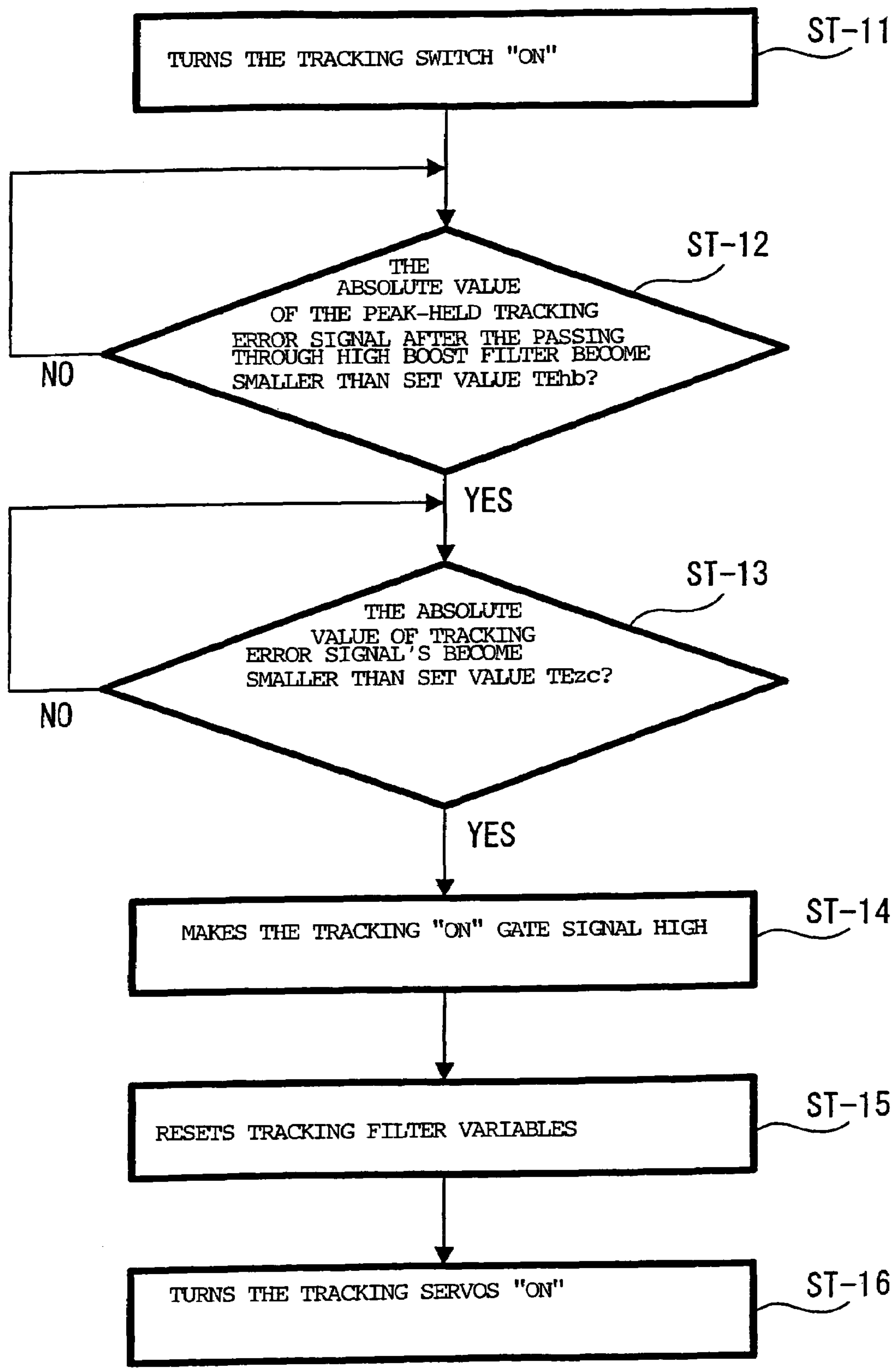
FIG. 8 is a flow chart illustrating the tracking pull-in operation of the tracking phase compensation means 18*f* illustrated in FIG. 2.
Figure 11:
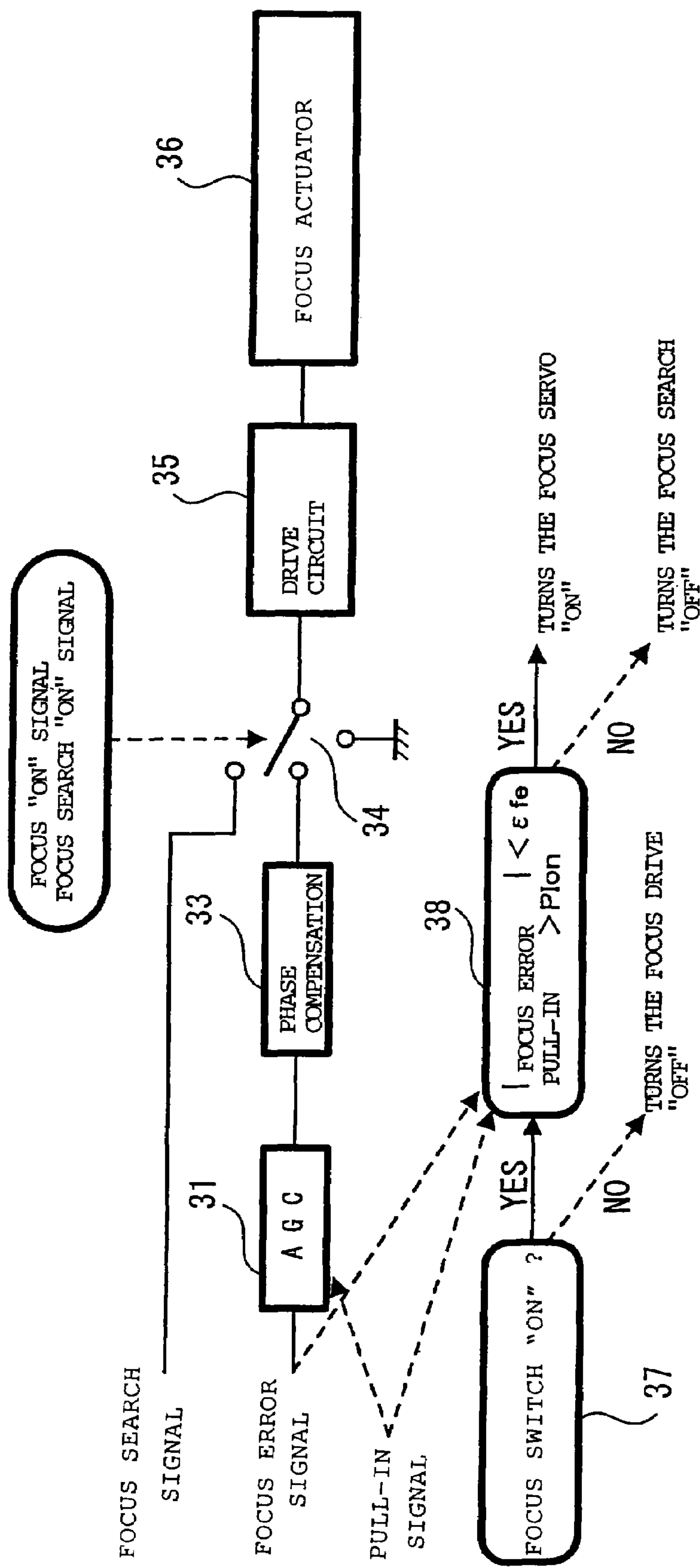
FIG. 11 is a block diagram illustrating a focus servo of a conventional optical disc recording and reproducing apparatus.
Figure 14:
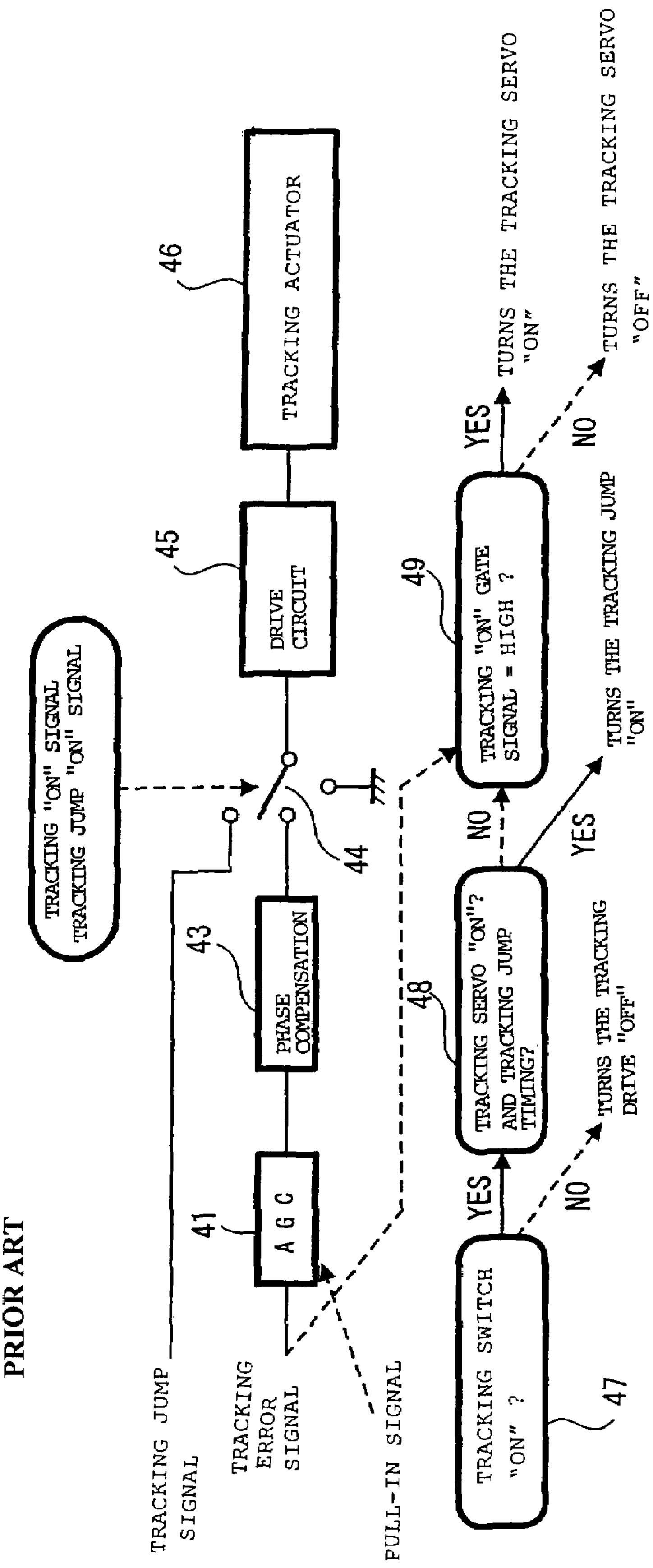
FIG. 14 is a block diagram illustrating a tracking servo of the prior art optical disc recording and reproducing apparatus.

Next, with reference to a flow chart of FIG. 8, the tracking pull-in operation of the tracking decision means 18*d* in FIG. 2 will be explained. In a step ST-11, after the tracking switch 18*e* is turned "ON", the operation flow proceeds to a step ST-12, in which it is judged whether the absolute value of the peak-held tracking error signal that is after the passing through the high-boost filter (see FIG. 9B) has become smaller than a set value TEhb or not. If "NO" judgment is made in the step ST-12, the flow returns to the step ST-12 while if "YES", the flow proceeds to a step ST-13, in which it is judged whether the absolute value of the tracking error signal (see FIG. 9A) has become smaller than a set value TEzc or not. If "NO" in the step ST-13, the flow returns to the step ST-13, while if "YES", the flow proceeds to a step ST-14.

In the step ST-14, the tracking "ON" gate signal (see FIG. 9C) is made high in level. Next to the step ST-14, the flow proceeds to a step ST-15, and resetting the variables of the tracking filters. Next to the step ST-15, the flow proceeds to a step ST-16, and turning the tracking servo "ON".

FIGS. 9A to 9C illustrate a method of producing a tracking "ON" gate signal. FIG. 9A illustrates the tracking error signal; FIG. 9B illustrates the tracking error signal that is after the passing through the high-boost filter; and FIG. 9C illustrates the tracking "ON" gate signal.

Next, with reference to FIG. 10, an example of the focus servo having an analog construction will be explained. Whether a tracking switch (not illustrated) indicating the instruction from the microcomputer is "ON" or not is discriminated by discrimination means 47. If "NO", the tracking drive signal is turned "OFF". The tracking error signal that is obtained by calculating the optical-detection output from the multi-divisional photo-detector of the optical head is supplied to an AGC (Automatic Gain Control) circuit 41. This signal has its level automatically controlled in correspondence with the level of a Pull-In signal and then, by passing through a switch 42 that is turned "ON" by the tracking "ON" signal and that is turned "OFF" when otherwise, i.e. through the switch 42 that the input side of a phase compensation circuit 43 is grounded, is supplied to the phase compensation circuit 43, in which the signal is subjected to phase compensation.

By providing this switch 42, the tracking drive signal supplied to a drive circuit 45 gets overshooting lessened or decreased from immediately after the tracking is turned "ON", with the result that the pull-in operation of the tracking servo becomes possible to perform.

When a tracking switch (not illustrated) is "ON", the tracking jump signal and the tracking error signal from the phase compensation circuit 43 which has its level automatically controlled and has its phase-compensated are changed over by the tracking drive changeover switch 44 under the control of the tracking jump "ON" signal and the tracking "ON" signal and then the signal is supplied to the drive circuit 45.

For a while after the tracking switch (not illustrated) is changed over from its "OFF" state to its "ON" state, it is discriminated by discrimination means 49, i.e. a monitor for monitoring the tracking gate signal, whether the tracking "ON" gate signal has a high level or not. When "YES", the tracking servo becomes "ON" while when "NO" the tracking servo becomes "OFF". The tracking "ON" gate signal has a high level when the absolute value of the tracking error signal of FIG. 9A is under a threshold value TEzc and in addition the absolute value of the peak-held tracking error signal that is obtained, as illustrated in FIG. 9B, after the tracking error signal is passed through the high-boost filter has become under a threshold value TEhb. After the tracking servo is turned "ON", it is discriminated by the discrimination means 48 whether the tracking servo is "ON" and it is the tracking jump timing or not. When "YES", namely when it is the tracking jump timing, the tracking jump is turned "ON". By the tracking jump "ON" signal, the tracking drive changeover switch 44 is changed over to the tracking jump signal side, whereby the tracking jump signal is supplied to a tracking drive circuit 45 via the tracking drive changeover switch 44. By the tracking drive signal from the drive circuit 45, a tracking actuator 46 is driven.

According to the present invention, since it has been arranged that, in a position control apparatus including position error signal detection means for detecting a position error signal of a mechanical part and position control means for controlling the position of the mechanical part by supplying to it the position error signal from the position error signal detection means, the device has provided therein phase compensation means comprising a digital filter; the position error signal be supplied to the phase compensation means to perform phase compensation thereon and the phase-compensated position error signal be supplied to the position control means and, when starting closed-loop control, filter variables that were used at a time preceding by an amount of time equal to or greater than that corresponding to the amount of one sampling time of the digital filter has been reset, it is possible, even when the range within which the mechanical part is pulled in for position control is narrow, to obtain the position control device enabling quickly stabilizing the pull-in operation.

According to the present invention, since it has been arranged that, in a position control method arranged to include detecting a position error signal of a mechanical part to control the position of the mechanical part by the position error signal, the method includes supplying the position error signal to phase compensation means comprising a digital filter to perform phase compensation thereon, controlling the position of the mechanical part by the phase-compensated position error signal, and, when starting a closed-loop control, putting filter variables that were used at a time preceding by an amount of time equal to or greater than that corresponding to the amount of one sampling time of the digital filter in a reset state, it is possible, even when the range within which the mechanical part is pulled in for position control is narrow, to obtain the position control method enabling quickly stabilizing the pull-in operation.

According to the present invention, since it has been arranged that, in a optical disc recording apparatus including position error signal detection means for detecting a position error signal of a mechanical part and position control means for controlling the position of the mechanical part by supplying to it the position error signal from the position error signal detection means, the apparatus has provided therein phase compensation means comprising a digital filter; the position error signal be supplied to the phase compensation means to perform phase compensation thereon and the phase-compensated position error signal be supplied to the position control means; and, when starting a closed-loop control, filter variables that were used at a time preceding by an amount of time equal to or greater than that corresponding to the amount of one sampling time of the digital filter has been reset, it is possible, even when the range within which the mechanical part is pulled in for position control is narrow, to obtain the optical disc recording apparatus enabling quickly stabilizing the pull-in operation.

According to the present invention, since it has been arranged that, in a optical disc recording method arranged to include detecting a position error signal of a mechanical part to control the position of the mechanical part by the position error signal, the method includes supplying the position error signal to phase compensation means comprising a digital filter to perform phase compensation thereon, controlling the position of the mechanical part by the phase-compensated position error signal, and, when starting a closed-loop control, putting filter variables that were used at a time preceding by an amount of time equal to or greater than that corresponding to the amount of one sampling time of the digital filter in a reset state, it is possible, even when the range within which the mechanical part is pulled in for position control is narrow, to obtain the optical disc recording method enabling quickly stabilizing the pull-in operation.

According to the present invention, since it has been arranged that, in a optical disc reproducing apparatus comprising position error signal detection means for detecting a position error signal of a mechanical part and position control means for controlling the position of the mechanical part by supplying to it the position error signal from the position error signal detection means, the apparatus has provided therein phase compensation means comprising a digital filter; the position error signal be supplied to the phase compensation means to perform phase compensation thereon and the phase-compensated position error signal be supplied to the position control means; and, when starting a closed-loop control, filter variables that were used at a time preceding by an amount of time equal to or greater than that corresponding to the amount of one sampling time of the digital filter has been reset, it is possible, even when the range within which the mechanical part is pulled in for position control is narrow, to obtain enabling quickly stabilizing the pull-in operation.

According to the present invention, since it has been arranged that, in a optical disc reproducing method arranged to include detecting a position error signal of a mechanical part to control the position of the mechanical part by the position error signal, the method includes supplying the position error signal to phase compensation means comprising a digital filter to perform phase compensation thereon, controlling the position of the mechanical part by the phase-compensated position error signal, and, when starting a closed-loop control, putting filter variables that were used at a time preceding by an amount of time equal to or greater than that corresponding to the amount of one sampling time of the digital filter in a reset state, it is possible, even when the range within which the mechanical part is pulled in for position control is narrow, to obtain the optical disc reproducing method enabling quickly stabilizing the pull-in operation.

According to the present invention, since it has been arranged that, in a position control apparatus including position error signal detection means for detecting a position error signal of a mechanical part and position control means for controlling the position of the mechanical part by supplying to it the position error signal from the position error signal detection means, the device has provided therein phase compensation means; the position error signal be supplied to the phase compensation means to perform phase compensation thereon and the phase-compensated position error signal be supplied to the position control means; and, at a stage preceding the phase compensation means there be provided on/off switch means that is turned on or off in interlocking relationship with the on/off operation of a servo-loop, it is possible, even when the range within which the mechanical part is pulled in for position control is narrow, to obtain the position control device enabling quickly stabilizing the pull-in operation.

According to the present invention, since it has been arranged that, in a position control method arranged to include detecting a position error signal of a mechanical part to control the position of the mechanical part by the position error signal, the method includes supplying the position error signal to phase compensation means to perform phase compensation thereon, controlling the position of the mechanical part by the phase-compensated position error signal, and turning on or off the position error signal supplied to the phase compensation means in interlocking relationship with the on/off operation of a servo-loop, it is possible, even when the range within which the mechanical part is pulled in for position control is narrow, to obtain the position control method enabling quickly stabilizing the pull-in operation.

According to the present invention, since it has been arranged that, in a optical disc recording apparatus including position error signal detection means for detecting a position error signal of a mechanical part and position control means for controlling the position of the mechanical part by supplying to it the position error signal from the position error signal detection means, the apparatus has provided therein phase compensation means; the position error signal be supplied to the phase compensation means to perform phase compensation thereon and the phase-compensated position error signal be supplied to the position control means; and, at a stage preceding the phase compensation means there be provided on/off switch means that is turned on or off in interlocking relationship with the on/off operation of a servo-loop, it is possible, even when the range within which the mechanical part is pulled in for position control is narrow, to obtain the optical disc recording apparatus enabling quickly stabilizing the pull-in operation.

According to the present invention, since it has been arranged that, in a optical disc recording method arranged to include detecting a position error signal of a mechanical part to control the position of the mechanical part by the position error signal, the method includes supplying the position error signal to phase compensation means to perform phase compensation thereon, controlling the position of the mechanical part by the phase-compensated position error signal, and turning on or off the position error signal supplied to the phase compensation means in interlocking relationship with the on/off operation of a servo loop, it is possible, even when the range within which the mechanical part is pulled in for position control is narrow, to obtain the optical disc recording method enabling quickly stabilizing the pull-in operation.

According to the present invention, since it has been arranged that, in a optical disc reproducing apparatus comprising position error signal detection means for detecting a position error signal of a mechanical part and position control means for controlling the position of the mechanical part by supplying to it the position error signal from the position error signal detection means, the apparatus has provided therein phase compensation means; the position error signal be supplied to the phase compensation means to perform phase compensation thereon and the phase-compensated position error signal be supplied to the position control means; and, at a stage preceding the phase compensation means there be provided on/off switch means that is turned on or off in interlocking relationship with the on/off operation of a servo-loop, it is possible, even when the range within which the mechanical part is pulled in for position control is narrow, to obtain enabling quickly stabilizing the pull-in operation.

According to the present invention, since it has been arranged that, in a optical disc reproducing method arranged to include detecting a position error signal of a mechanical part to control the position of the mechanical part by the position error signal, the method includes supplying the position error signal to phase compensation means to perform phase compensation thereon, controlling the position of the mechanical part by the phase-compensated position error signal, and turning on or off the position error signal supplied to the phase compensation means in interlocking relationship with the on/off operation of a servo loop, it is possible, even when the range within which the mechanical part is pulled in for position control is narrow, to obtain the optical disc reproducing method enabling quickly stabilizing the pull-in operation.

The invention clamed is:

1. A position control apparatus, comprising:

a position error signal detector that detects a position error signal of a mechanical part;

a phase compensator, wherein the position error signal is supplied to said phase compensator to perform phase compensation thereon;

a position controller that controls a position of the mechanical part based on the phase compensated position error signal from said phase compensator;

a first switch connected between said phase compensator and said position controller, the first switch configured to be (1) turned off when a focus drive is off, (2) to be connected to the phase compensator, and (3) to be connected to a focus search signal; and a determination device that determines whether an absolute value of a focus error is smaller than a predetermined value and whether a pull-in signal value is greater than a threshold;

wherein said first switch is (a) connected to the focus search signal when the determination device determines that the absolute value of the focus error is larger than the predetermined value and the pull-in signal value is less than the threshold and (b) is connected to the phase compensator when the determination device determines the absolute value of the focus error is smaller than the predetermined value and the pull-in signal value is greater than the threshold;

an on/off second switch positioned between said position error signal detector and said phase compensator, and that is turned on to connect said position error signal detector to said phase compensator when the determination device determines the absolute value of the focus error is smaller than the predetermined value and the pull-in signal value is greater than the threshold.

2. The position control apparatus according to claim 1, wherein the mechanical part is an objective lens; and the position error signal is a focus error signal.

3. The position control apparatus according to claim 1, wherein the mechanical part is an objective lens; and the position error signal is a tracking error signal.

4. A position control method to be executed in a position control apparatus including a position error signal detector that detects a position error signal of a mechanical part, a phase compensator connected to the position error signal detector through an on/off second switch, and that receives the position error signal, and a position controller connected to the phase compensator by a first switch, and that controls a position of the mechanical part based on the phase compensated position error signal from the phase compensator the first switch configured to be (1) turned off when a focus drive is off, (2) to be connected to the phase compensator, and (3) to be connected to a focus search signal, the method comprising:

supplying the position error signal to the phase compensator through the on/off second switch to perform phase compensation thereon;

controlling the position of the mechanical part by the phase compensated position error signal;

determining whether an absolute value of a focus error is smaller than a predetermined value and whether a pull-in signal value is greater than a threshold;

controlling said first switch to be (a) connected to the focus search signal when the determination device determines that the absolute value of the focus error is larger than the predetermined value and the pull-in signal value is less than the threshold and to be (b) connected to the phase compensator when the determination device determines the absolute value of the focus error is smaller than the predetermined value and the pull-in signal value is greater than the threshold;

turning on the position error signal supplied to the phase compensator through the on/off second switch between the phase compensator and the position error signal detector to connect said position error signal detector to said phase compensator when the determination device determines the absolute value of the focus error is smaller than the predetermined value and the pull-in signal value is greater than the threshold.

5. The position control method according to claim 4, wherein the mechanical part is an objective lens; and the position error signal is a focus error signal.

6. The position control method according to claim 4, wherein the mechanical part is an objective lens; and the position error signal is a tracking error signal.

7. An optical disc recording apparatus comprising:

an optical head to record data on an optical disc;

a position control apparatus to control a position of a mechanical part, and comprising:

a position error signal detector that detects a position error signal of the mechanical part;

a phase compensator, wherein the position error signal is supplied to said phase compensator to perform phase compensation thereon;

a position controller that controls a position of the mechanical part based on the phase compensated position error signal from said phase compensator;

a first switch connected between said phase compensator and said position controller, the first switch configured to be (1) turned off when a focus drive is off, (2) to be connected to the phase compensator, and (3) to be connected to a focus search signal; and a determination device that determines whether an absolute value of a focus error is smaller than a predetermined value and whether a pull-in signal value is greater than a threshold;

wherein said first switch is (a) connected to the focus search signal when the determination device determines that the absolute value of the focus error is larger than the predetermined value and the pull-in signal value is less than the threshold and (b) is connected to the phase compensator when the determination device determines the absolute value of the focus error is smaller than the predetermined value and the pull-in signal value is greater than the threshold;

an on/off second switch positioned between said position error signal detector and said phase compensator, and that is turned on to connect said position error signal detector to said phase compensator when the determination device determines the absolute value of the focus error is smaller than the predetermined value and the pull-in signal value is greater than the threshold.

8. The optical disc recording apparatus according to claim 7, wherein the mechanical part is an objective lens; and the position error signal is a focus error signal.

9. The optical disc recording apparatus according to claim 7, wherein the mechanical part is an objective lens; and the position error signal is a tracking error signal.

10. An optical disc recording method, comprising:

controlling an optical head to record data on an optical disc;

a position control method to control a position of a mechanical part and to be executed in a position control apparatus including a position error signal detector that detects a position error signal of the mechanical part, a phase compensator connected to the position error signal detector through an on/off second switch, and that receives the position error signal, and a position controller connected to the phase compensator by a first switch, and that controls a position of the mechanical part based on the phase compensated position error signal from the phase compensator, the first switch configured to be (1) turned off when a focus drive is off, (2) to be connected to the phase compensator, and (3) to be connected to a focus search signal, the position control method comprising:

supplying the position error signal to the phase compensator through the on/off second switch to perform phase compensation thereon;

controlling the position of the mechanical part by the phase-compensated position error signal;

a determination device that determines whether an absolute value of a focus error is smaller than a predetermined value and whether a pull-in signal value is greater than a threshold;

controlling said first switch to be (a) connected to the focus search signal when the determination device determines that the absolute value of the focus error is larger than the predetermined value and the pull-in signal value is less than the threshold and to be (b) connected to the phase compensator when the determination device determines the absolute value of the focus error is smaller than the predetermined value and the pull-in signal value is greater than the threshold;

turning on or off the position error signal supplied to the phase compensator through the on/off second switch between the phase compensator and the position error signal detectors to connect said position error signal detector to said phase compensator when the determination device determines the absolute value of the focus error is smaller than the predetermined value and the pull-in signal value is greater than the threshold.

11. The optical disc recording method according to claim 10, wherein said mechanical part is an objective lens; and said position error signal is a focus error signal.

12. The optical disc recording method according to claim 10, wherein the mechanical part is an objective lens; and the position error signal is a tracking error signal.

13. A reproducing apparatus for an optical disc, comprising:

an optical head for reproducing data from the optical disc;

a position control apparatus to control a position of a mechanical part, and comprising:

a position error signal detector that detects a position error signal of the mechanical part;

a phase compensator, wherein the position error signal is supplied to said phase compensator to perform phase compensation thereon;

a position controller that controls a position of the mechanical part based on the phase compensated position error signal from said phase compensator;

a first switch connected between said phase compensator and said position controller, the first switch configured to be (1) turned off when a focus drive is off, (2) to be connected to the phase compensator, and (3) to be connected to a focus search signal; and a determination device that determines whether an absolute value of a focus error is smaller than a predetermined value and whether a pull-in signal value is greater than a threshold;

wherein said first switch is (a) connected to the focus search signal when the determination device determines that the absolute value of the focus error is larger than the predetermined value and the pull-in signal value is less than the threshold and (b) is connected to the phase compensator when the determination device determines the absolute value of the focus error is smaller than the predetermined value and the pull-in signal value is greater than the threshold;

an on/off second switch positioned between said position error signal detector and said phase compensator, and that is turned on to connect said position error signal detector to said phase compensator when the determination device determines the absolute value of the focus error is smaller than the predetermined value and the pull-in signal value is greater than the threshold.

14. The reproducing apparatus according to claim 13, wherein the mechanical part is an objective lens; and the position error signal is a focus error signal.

15. The reproducing apparatus according to claim 13, wherein the mechanical part is an objective lens; and the position error signal is a tracking error signal.

16. An optical disc reproducing method, comprising:

controlling an optical head to reproduce data from an optical disc;

a position control method to control a position of a mechanical part and to be executed in a position control apparatus including a position error signal detector that detects a position error signal of the mechanical part, a phase compensator that receives the position error signal, and a position controller connected to the phase compensator connected to the position error signal detector through an on/off second switch, and by a first switch, and that controls a position of the mechanical part based on the phase compensated position error signal from the phase compensator, the first switch configured to be (1) turned off when a focus drive is off, (2) to be connected to the phase compensator, and (3) to be connected to a focus search signal, the position control method comprising:

supplying the position error signal to the phase compensator through the on/off second switch to perform phase compensation thereon;

controlling the position of the mechanical part by the phase compensated position error signal;

a determination device that determines whether an absolute value of a focus error is smaller than a predetermined value and whether a pull-in signal value is greater than a threshold;

controlling said first switch to be (a) connected to the focus search signal when the determination device determines that the absolute value of the focus error is larger than the predetermined value and the pull-in signal value is less than the threshold and to be (b) connected to the phase compensator when the determination device determines the absolute value of the focus error is smaller than the predetermined value and the pull-in signal value is greater than the threshold;

turning on or off the position error signal supplied to the phase compensator through the on/off second switch between the phase compensator and the position error signal detectors to connect said position error signal detector to said phase compensator when the determination device determines the absolute value of the focus error is smaller than the predetermined value and the pull-in signal value is greater than the threshold.

17. The optical disc reproducing method according to claim 16, wherein the mechanical part is an objective lens; and the position error signal is a focus error signal.

18. The optical disc reproducing method according to claim 16, wherein the mechanical part is an objective lens; and the position error signal is a tracking error signal.

* * * * *